United States Patent [19]

Sadlowski et al.

[11] 4,431,794

[45] Feb. 14, 1984

[54] CONTINUOUS PREPARATION OF OXYMETHYLENE POLYMERS

[75] Inventors: Juergen Sadlowski, Ludwigshafen; Manfred Walter, Speyer; Klaus Hinselmann, Mutterstadt, all of Fed. Rep. of Germany

[73] Assignee: BASF Aktiengesellschaft, Fed. Rep. of Germany

[21] Appl. No.: 443,614

[22] Filed: Nov. 22, 1982

[30] Foreign Application Priority Data

Nov. 28, 1981 [DE] Fed. Rep. of Germany ....... 3147309

[51] Int. Cl.³ .............................................. C08G 2/16
[52] U.S. Cl. .................................. 528/232; 528/230; 528/270; 528/480; 528/502; 528/503
[58] Field of Search ............... 528/232, 270, 480, 502, 528/503, 230

[56] References Cited

U.S. PATENT DOCUMENTS

| | | | |
|---|---|---|---|
| 3,227,690 | 4/1966 | Polly et al. | 528/232 X |
| 3,254,053 | 5/1966 | Fisher et al. | 528/241 |
| 3,442,866 | 5/1969 | Seddon et al. | 528/232 X |
| 4,224,435 | 9/1980 | Sugio et al. | 528/232 |
| 4,343,929 | 8/1982 | Sugio et al. | 528/241 |
| 4,366,305 | 12/1982 | Amemiya et al. | 528/480 X |
| 4,390,684 | 6/1983 | Komazawa et al. | 528/230 |

FOREIGN PATENT DOCUMENTS

| | | |
|---|---|---|
| 1161421 | 1/1964 | Fed. Rep. of Germany . |
| 3018898 | 11/1980 | Fed. Rep. of Germany . |
| 974819 | 11/1964 | United Kingdom . |
| 1155932 | 6/1969 | United Kingdom . |

*Primary Examiner*—Lucille M. Phynes
*Attorney, Agent, or Firm*—Keil & Witherspoon

[57] ABSTRACT

Oxymethylene polymers are prepared by a continuous process, by mass polymerization of the monomers with the aid of conventional, preferably cationic, initiators, wherein the monomers as well as the resulting polymer are present substantially in molten form during the polymerization.

7 Claims, No Drawings

CONTINUOUS PREPARATION OF OXYMETHYLENE POLYMERS

It is known that oxymethylene polymers can be prepared by continuous mass polymerization of the monomers in the presence of cationic initiators. German Patent 1,161,421, British Patent Nos. 974,819 and 1,155,932 and German Published Application DAS No. 3,018,898 describe processes in which the polymerization of trioxane is carried out in kneaders and extruders, in order to obtain the oxymethylene polymers in powder form, with very high conversions. These processes are carried out at below, or only slightly above, the boiling point of trioxane, requiring an involved procedure.

It is an object of the present invention to provide a continuous process for the mass polymerization of trioxane, which process is simple to carry out and to control, can furthermore be carried out in simple apparatus, using a small amount of energy, and, finally, gives homogeneous polymers of constant quality.

We have found that this object is achieved, in accordance with the invention, when the monomers as well as the resulting polymer are present in molten form during the mass polymerization.

The process according to the invention is preferably employed for the homopolymerization and the copolymerization of trioxane, but in principle tetroxane may also be used as the monomer.

All copolymerizable compounds conventionally employed in the copolymerization of trioxane may be used as comonomers, their proportion being in general from 0.1 to 15, in particular from 0.5 to 5, % by weight, based on the total amount of monomers. Examples of suitable comonomers are cyclic ethers and in particular cyclic acetals having 2 or more adjacent carbon atoms and, in particular, from 3 to 9 ring members, e.g. ethylene oxide, propylene oxide, trimethylene oxide, butadiene oxide, 1,3-dioxolane, 1,4-butanediol formal, diethylene glycol formal, o-xylene glycol formal, thiodiglycol formal and 1,3-oxthiolane, and mixtures of these. Further suitable comonomers are copolymerizable, olefinically unsaturated compounds, e.g. styrene and isobutylene, and polyacetals, in particular linear polyacetals, which contain —COC groups in the chain, e.g. polydioxolane. The molecular weights of the polymers can, if required, be brought to the desired values by means of the regulators conventionally employed in trioxane polymerization. Suitable regulators are acetals or formals of monohydric alcohols, the alcohols themselves, and the small amounts of water which effect chain transfer and whose presence as a rule cannot be avoided completely. The regulator is employed in an amount of from 10 to 10,000, preferably from 100 to 3,000, ppm.

Preferred initiators are the cationic ones conventionally used in trioxane polymerization, suitable examples being protic acids, such as fluoroalkylsulfonic, chloroalkylsulfonic, fluoroarylsulfonic and chloroarylsulfonic acids, e.g. trifluoromethanesulfonic acid and trifluoromethanesulfonic anhydride, and Lewis acids, e.g. tin tetrachloride, arsenic pentafluoride, phosphorus pentafluoride and boron trifluoride, and their complex compounds and salt-like compounds, e.g. boron trifluoride etherates and triphenylmethyl hexafluorophosphate. Of course, only those initiators which are sufficiently stable under the polymerization conditions may be employed, the amounts used being about 0.01–1,000 ppm, preferably 0.05–10 ppm. In general, it is advisable to add the initiator in dilute form, preferably in a concentration of from 0.005 to 5% by weight, suitable solvents for this purpose being inert compounds, such as aliphatic, cycloaliphatic and haloaliphatic hydrocarbons, glycol ethers, etc.

Monomers, initiators and, where relevant, regulators may be premixed in any desired manner and then introduced into the polymerization reactor, or may even be introduced separately from one another. It is advantageous if the trioxane is introduced in molten form. The polymerization reactor may be an extruder, a kneader, a stirred kettle or a gear pump, or a flow tube with or without static mixing elements. It should be possible to heat or cool the reactor, and also to impose a temperature profile on it. The reaction may be carried out isothermally or adiabatically, since the relatively low enthalpy of polymerization does not give rise to any problems with regard to the supply and removal of heat. To control the incorporation of comonomers during the preparation of the copolymer, comonomer metering points can be provided along the reactor. Additives for modifying the impact resistance of the oxymethylene polymers may also be metered in a controlled manner.

In accordance with the invention, the temperature and pressure in the polymerization zone is chosen so that the monomers and the polymer are present in molten form, preferably as a homogeneous phase. Trioxane melts are 65° C., and boils at 115° C. under atmospheric pressure. Since the polymerization temperature is higher than this, polymerization must be carried out under superatmospheric pressure, preferably under 2–500 bar, in particular 5–50 bar. Under the reaction conditions, the trioxane is in equilibrium with about 1–5% of formaldehyde, some of which, in a closed system, may be present in gaseous form. The oxymethylene homopolymer melts at about 176° C.; incorporation of relatively large amounts of comonomers can lower the melting point to about 150° C., and the presence of unreacted trioxane dissolved in the polymer can lower it even further. The material temperature in the polymerization reactor should not exceed 300° C. since oxymethylene polymers undergo increasingly rapid decomposition at such high temperatures; it is particularly preferably from 135° to 200° C.

We have found that the polymerization conversion is higher the lower the polymerization temperature. For this reason, it is desirable to carry out the polymerization in the homogeneous fluid range of the system polymer/monomer, at very low temperature. At a polymerization temperature of about 130°–135° C., small amounts of finely divided polymer separate out from the homogeneous oxymethylene polymer/trioxane melt, at a Conversion of about 65%. A suspension of solid polymer in the polymer/monomer melt is formed which remains fluid and readily transportable if it contains no more than 10, preferably no more than 5, % by weight of solid, so that the advantages of the invention are preserved. When the polymerization is carried out in screw reactors, the greater dissipation energy resulting from the increase in viscosity due to the formation of the suspension, and the heating resulting from this dissipation energy, cause some or all of the precipitated polymer to melt again, so that the system is virtually automatically kept at the homogeneous/heterogeneous fluid boundary. This applies in particular in the temperature range in which the reactor jacket temperatures are up to about 30° C. below the preferred lower limit of 135° C. for the material temperature.

The material temperature of the monomer/polymer mixture is very difficult to measure exactly, but the external temperature of the polymerization reactor may be used as a point of reference. It is important that the crude polymer be obtained in fluid form, preferably in homogeneous, molten form. We have found, surprisingly, that, in contrast to the literature (Angew. Chemie 79, 1967, 512, and German Patent 1,161,421, column 1, lines 6 to 22), a high molecular weight polymer is formed in the mass polymerization of trioxane even above the ceiling temperature of 127° C. Oxymethylene polymers obtained in solid form by conventional cationic polymerization processes exhibit a bimodal molecular weight distribution, while, in contrast, those obtained in molten form by the novel polymerization process have a unimodal molecular weight distribution. The molecular weight of the oxymethylene polymers prepared according to the invention is preferably above 10,000, in particular above 20,000.

The residence time of the polymerization mixture in the polymerization zone is advantageously from 0.1 to 20 minutes, preferably from 0.4 to 5 minutes. The polymerization is carried out to a conversion of preferably 30% or more, in particular more than 60%. Under favorable conditions, conversions of as much as 80% may also be achieved.

In the preparation of oxymethylene homopolymers, the terminal alcohol groups may be reacted, in the fluid phase, directly with an epoxide, an acid anhydride or an acetal, if desired after deactivation of the polymerization catalyst and addition of another catalyst, in the absence of a solvent, to give thermally stable ether or ester groups.

The polymerization mixture is deactivated, devolatilized and compounded, these stages preferably being carried out directly after the polymerization, without a phase change taking place. This procedure has the advantage that the polymer does not require to be melted for compounding, so that energy can be saved in carrying out the process.

The catalyst radicals are deactivated by adding deactivators to the polymerization melts. Suitable deactivators are ammonia, aliphatic and aromatic amines, alcohols, basic salts, e.g. sodium carbonate and borax, and water. They are added in amounts of, preferably, no more than 1% by weight.

The deactivation reactor space is separated from that of the polymerization reactor in such a manner that the polymer/monomer melt can pass over unhindered, but penetration of the deactivators into the polymerization reactor is reliably avoided. Separation is effected by incorporated constrictions which increase the flow velocity of the melt locally; where extruders are used, this is achieved, for example, by baffles. The deactivation reactor is designed so that the polymer/monomer melt is thoroughly mixed within a short period. In the case of extruders, this can be achieved in practice by incorporating special kneading elements or backmixing elements. The deactivation reactor is advantageously at from 150° to 300° C., preferably at from 170° to 250° C. Stabilizers may be added to the melt even in the deactivation reactor, these being added preferably together with the deactivators.

In the downstream devolatilizing and compounding reactor, the unstable chain ends of the polymer are subjected to thermal degradation. The resulting decomposition products, in particular formaldehyde, and the unreacted monomers are removed by vaporization under reduced pressure. In this reactor, the conventional additives, for example light stabilizers, heat stabilizers, antioxidants, nucleating agents, dyes, pigments, lubricants, fillers and reinforcing agents, e.g. glass fibers, are also mixed in. On emerging from the compounding reactor, the ready-prepared oxymethylene polymer can be granulated. Compared with conventionally prepared polymers, it possesses better mechanical properties, for example greater toughness and rigidity, and is more homogeneous, which is evident from the fact that it is speckfree. It is suitable for conventional purposes.

In the Example which follows, parts and percentages are by weight.

EXAMPLE

Liquid trioxane at 80° C. is mixed with 2% of butanediol formal and 0.017% of methylal, the mixture is heated to 160° C., and 0.29 ppm of trifluoromethanesulfonic acid (as a 0.004% strength solution in diethylene glycol dimethyl ether) is then added. The mixture is introduced into a polymerization reactor which comprises a twin-screw extruder (ZSK 30 from Werner Pfleiderer) with a length:diameter ratio of 20. The reactor is heated to 169° C., the pressure in the reactor is 4 bar, and the residence time is about 2 minutes. The melt then passes into the deactivation reactor, which is located in the same extruder and separated by a baffle. In this reactor, 0.55% of methyldiethanolamine are added, the residence time here being about 0.2 minute. Thereafter, the melt enters the devolatilizing and compounding reactor, which likewise is separated from the deactivation reactor by a baffle. Thermal degradation takes place at 220° C., during a residence time of about 3 minutes. Unreacted trioxane and any byproducts formed are stripped off under 0.01 bar. The ready-prepared polymer is extruded and granulated. The conversion, based on monomer employed, is 69.2%. The granules have a melt index MI (190° C., 2.16 kg) of 4 g/minute and a thermal stability in nitrogen (2 hours, 220° C.) of 99.8%.

We claim:

1. A continuous process for the preparation of an oxymethylene polymer by mass polymerization of the monomer with the aid of a conventional initiator, in the presence or absence of a regulator, wherein during the polymerization the polymerization mixture is present in fluid form.

2. A continuous process for the preparation of an oxymethylene polymer as set forth in claim 1, wherein during the polymerization the monomer as well as the resulting polymer are present in molten form.

3. A continuous process for the preparation of an oxymethylene copolymer as set forth in claim 1, wherein, directly after the polymerization, the polymer is deactivated, devolatilized and compounded, without a phase change taking place between the stages of the process.

4. A continuous process for the preparation of an oxymethylene homopolymer as set forth in claim 1, wherein, directly after the polymerization, and if appropriate after the deactivation of the polymerization initiator, the polymer is subjected to a blocking reaction to produce thermally stable terminal groups, this being done without a phase change taking place between the stages of the process.

5. A process as set forth in claim 1, wherein a monomer(s) is trioxane.

6. A process as set forth in claim 2, wherein a monomer(s) is trioxane.

7. A process as set forth in claim 3, wherein a monomer(s) is trioxane.

* * * * *